United States Patent [19]

Nakai et al.

[11] Patent Number: 5,343,304
[45] Date of Patent: Aug. 30, 1994

[54] IMAGE FORMING APPARATUS CONTROLLING THE ORIENTATION OF THE IMAGE ON A SHEET FOR AUTOMATIC POST-PROCESSING

[75] Inventors: Yasuhiro Nakai, Soraku; Shoichiro Yoshiura, Yamato-Koriyama, both of Japan

[73] Assignee: Sharp Kabushiki Kaisha, Osaka, Japan

[21] Appl. No.: 858,993

[22] Filed: Mar. 27, 1992

[30] Foreign Application Priority Data

Mar. 29, 1991 [JP] Japan ................. 3-066774

[51] Int. Cl.⁵ ................. H04N 1/38; B42B 4/00; G03G 15/00
[52] U.S. Cl. ................. 358/296; 355/324; 270/53
[58] Field of Search ............. 358/296, 300, 302, 452; 355/208, 324; 382/46; 395/105, 111, 117, 137; 270/37, 53

[56] References Cited

U.S. PATENT DOCUMENTS

| | | | |
|---|---|---|---|
| 4,636,872 | 1/1987 | Prichard | 358/296 |
| 4,763,167 | 8/1988 | Watanabe et al. | 355/324 |
| 4,905,054 | 2/1990 | Rood | 355/324 |
| 5,053,831 | 10/1991 | Ishiguro et al. | 355/324 |
| 5,129,639 | 7/1992 | DeHority | 270/37 X |
| 5,229,816 | 7/1993 | Fujimoto et al. | 355/208 |
| 5,231,516 | 7/1993 | Kamon et al. | 358/296 x |

FOREIGN PATENT DOCUMENTS

| | | |
|---|---|---|
| 0324245 | 7/1989 | European Pat. Off. |
| 0370475 | 5/1990 | European Pat. Off. |
| 56-27129 | 3/1981 | Japan . |
| 61-89051 | 5/1986 | Japan . |
| 64-77546 | 3/1989 | Japan . |
| 56-27128 | 3/1991 | Japan . |

OTHER PUBLICATIONS

Patent Abstracts of Japan, vol. 12, No. 303 (P-746) Aug. 18, 1988 & JP-A-63 074 075 (Canon).
Patent Abstracts of Japan vol. 14, No. 69 (M-932) Feb. 8, 1990 & JP-A-01 288 461 (Canon).

*Primary Examiner*—Benjamin R. Fuller
*Assistant Examiner*—Eric Frahn
*Attorney, Agent, or Firm*—David G. Conlin; George W. Neuner

[57] ABSTRACT

An image forming apparatus provided with a post-processing device for performing a post-processing on an image-formed sheet includes a unit for reading an image on an original and a mark on a mark sheet, a unit for forming an image data read by the reading unit on a sheet of paper by performing a predetermined processing on the read image data, and a unit for controlling a direction of the image data to be formed on the sheet of paper for performing the post-processing done by the post-processing device at a specified place of the image-formed sheet of paper based on the location of the mark on the mark sheet read by the reading unit.

6 Claims, 14 Drawing Sheets

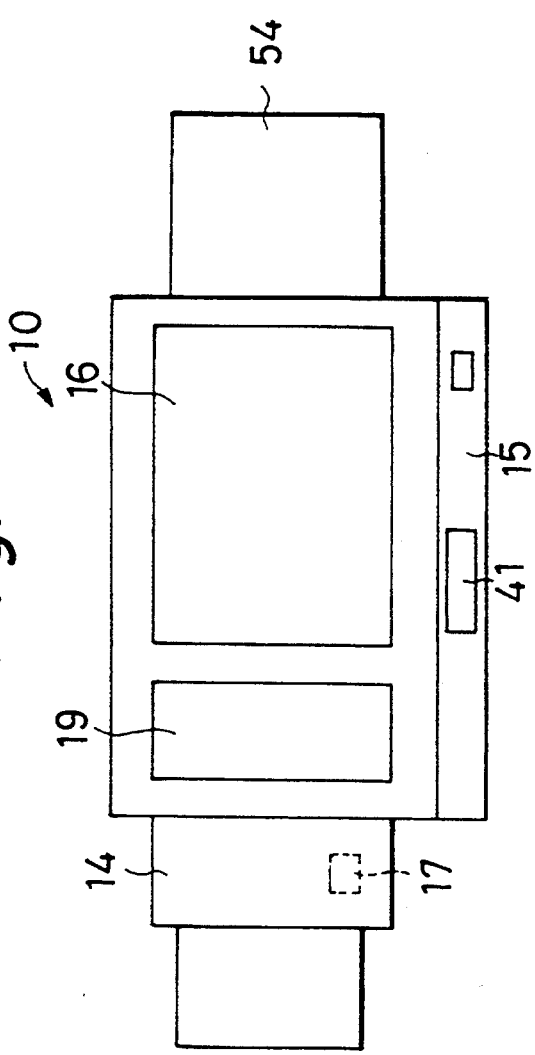
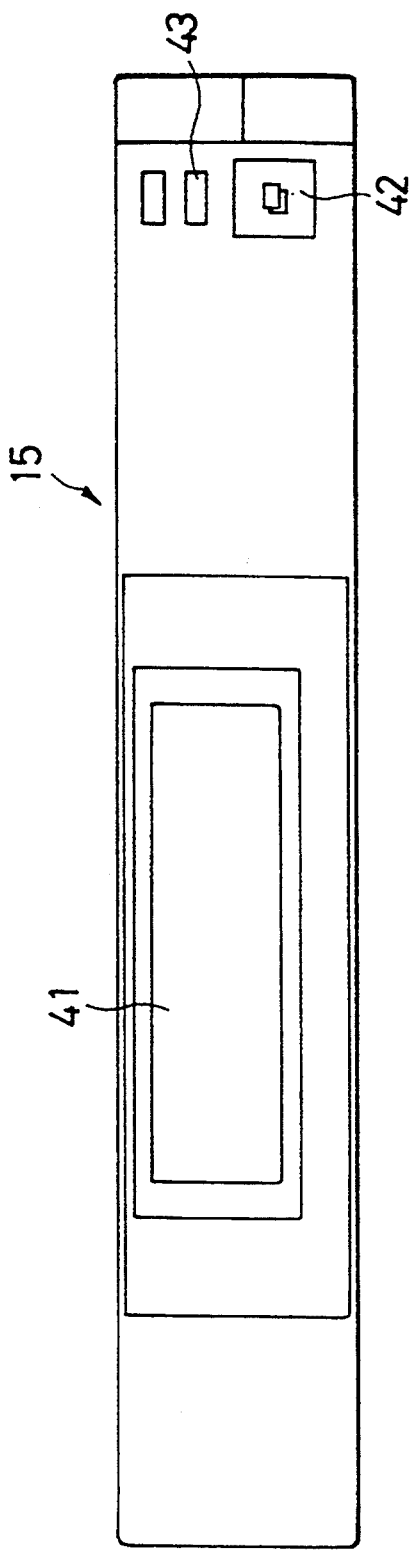

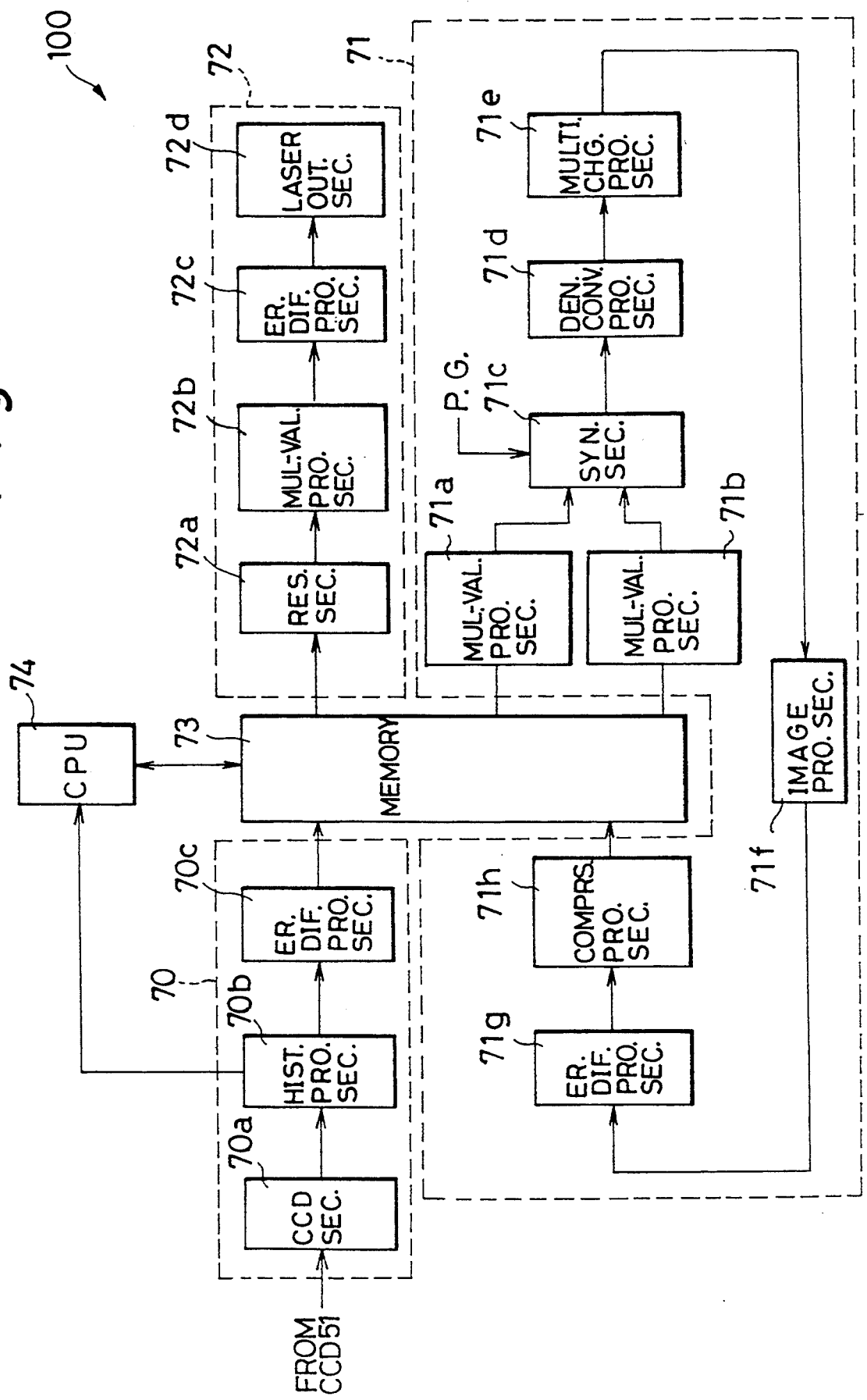

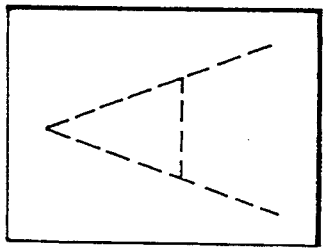
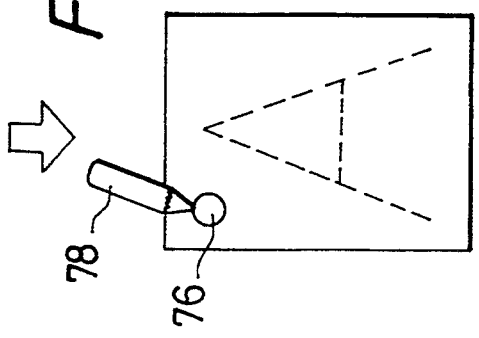
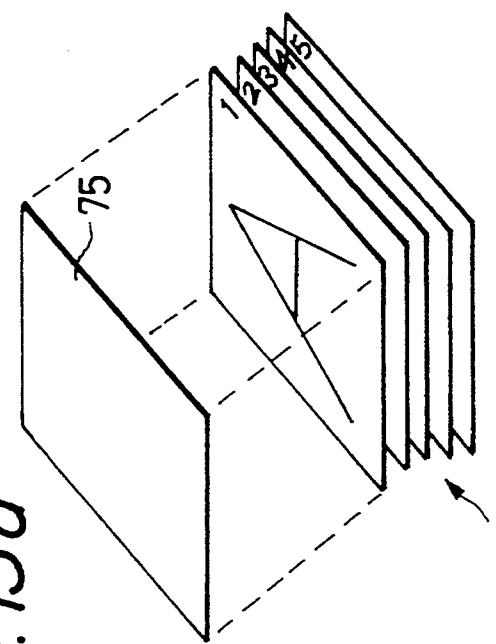
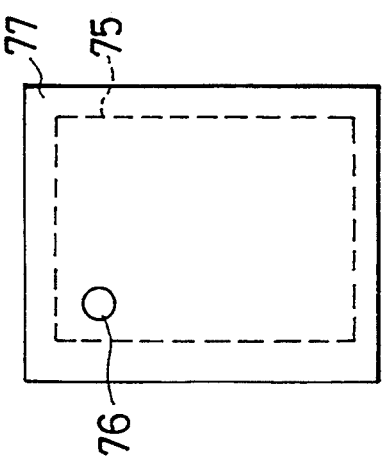

⇐ PAPER FEEDING DIRECTION

STAPLE POSITION

STAPLE POSITION

IMAGE FORMING APPARATUS CONTROLLING THE ORIENTATION OF THE IMAGE ON A SHEET FOR AUTOMATIC POST-PROCESSING

BACKGROUND OF THE INVENTION

1. Field of the Invention

The present invention relates to an image forming apparatus provided with a post-processing device and more particularly to the image forming apparatus which provides a post-processing device such as a stapling device or a punching device.

2. Background of the Related Art

The present inventors know a digital copying machine as an example of an image forming apparatus. The digital copying machine is arranged to take the steps of reading an original with a CCD (Charge Coupled Device) image sensor of a scanner, converting an analog signal of the read image into a digital signal, processing the digital signal, storing the processed digital signal in a memory, reading the image data stored in the memory if necessary, and outputting the image data to the image forming unit such as a laser printer for copying the resulting image on paper.

The present inventors also know a commercially available copying system having a post-processing device functioned as a peripheral device. Such a post-processing device includes a stapling device, a punching device, and a starching and binding device. Those devices are each arranged to bind copied sheets of paper as one bundle and work the bound sheets so that they are allowed to be filed.

Such the copying machine provided with the post-processing device, however, is limited in light of specification. For example, the post-processing device is generally located in a right place inside of the copying machine for the purpose of reducing the size of the copying machine or the installed area. That is to say, the post-processing device is located on the way of feeding paper or located on the side of a tray for receiving the ejected sheets of paper. Under the present condition, hence, the copying machine disallows the post-processing device to be located in any place desired by an operator.

Hence, an operator is required to load an original to a scanner unit as considering the location of the post-processing device and the direction of the image to be formed on the sheet. Such an operation is difficult-to-understand for an unfamiliar operator. It means that the known copying machine provided with the post-processing device is difficult-to-use for the operator. On the other hand, if the overall copying system is arranged so that the operator can locate the post-processing device in his or her desired place, the overall copying system is made larger in size and needs a large installed area.

SUMMARY OF THE INVENTION

It is therefore an object of the present invention to provide an image forming apparatus provided with a post-processing device which is capable of automatically performing the post-processing on any desired place of the image-copied sheet.

The object of the invention can be achieved by an image forming apparatus provided with a post-processing device for performing a post-processing on an image-formed sheet, including:

a unit for reading an image on an original;

a unit for forming an image data read by the reading unit on a sheet of paper by performing a predetermined processing on the read image data; and a unit for controlling a direction of the image data to be formed on the sheet of paper for performing the post-processing done by the post-processing device at a specified place of the image-formed sheet of paper.

In operation, the reading unit serves to read the image data of the original and the image forming unit serves to perform the predetermined processing with respect to the read image data for forming a desired image on the sheet of paper. The control unit serves to control the direction of the image to be formed on the sheet so that the post-processing device may carry out the post-processing at a desired location of the image-formed sheet of paper. The image forming apparatus, therefore, enables to automatically perform the post-processing at any desired location of the image-formed sheet of paper.

Further objects and advantages of the present invention will be apparent from the following description of the preferred embodiments of the invention as illustrated in the accompanying drawings.

BRIEF DESCRIPTION OF THE DRAWINGS

FIG. 2 is an exemplary plan view showing the copying machine shown in FIG. 1;

FIG. 4 is a view showing an outer appearance of an operation panel provided in the copying machine shown in FIG. 1;

FIG. 12 is a block diagram showing a control unit included in the copying machine shown in FIG. 1;

FIGS. 13a to 13d are explanatory views showing how the stapling device shown in FIG. 2 specifies a post-processing location;

DESCRIPTION OF THE PREFERRED EMBODIMENTS

Figure 1:
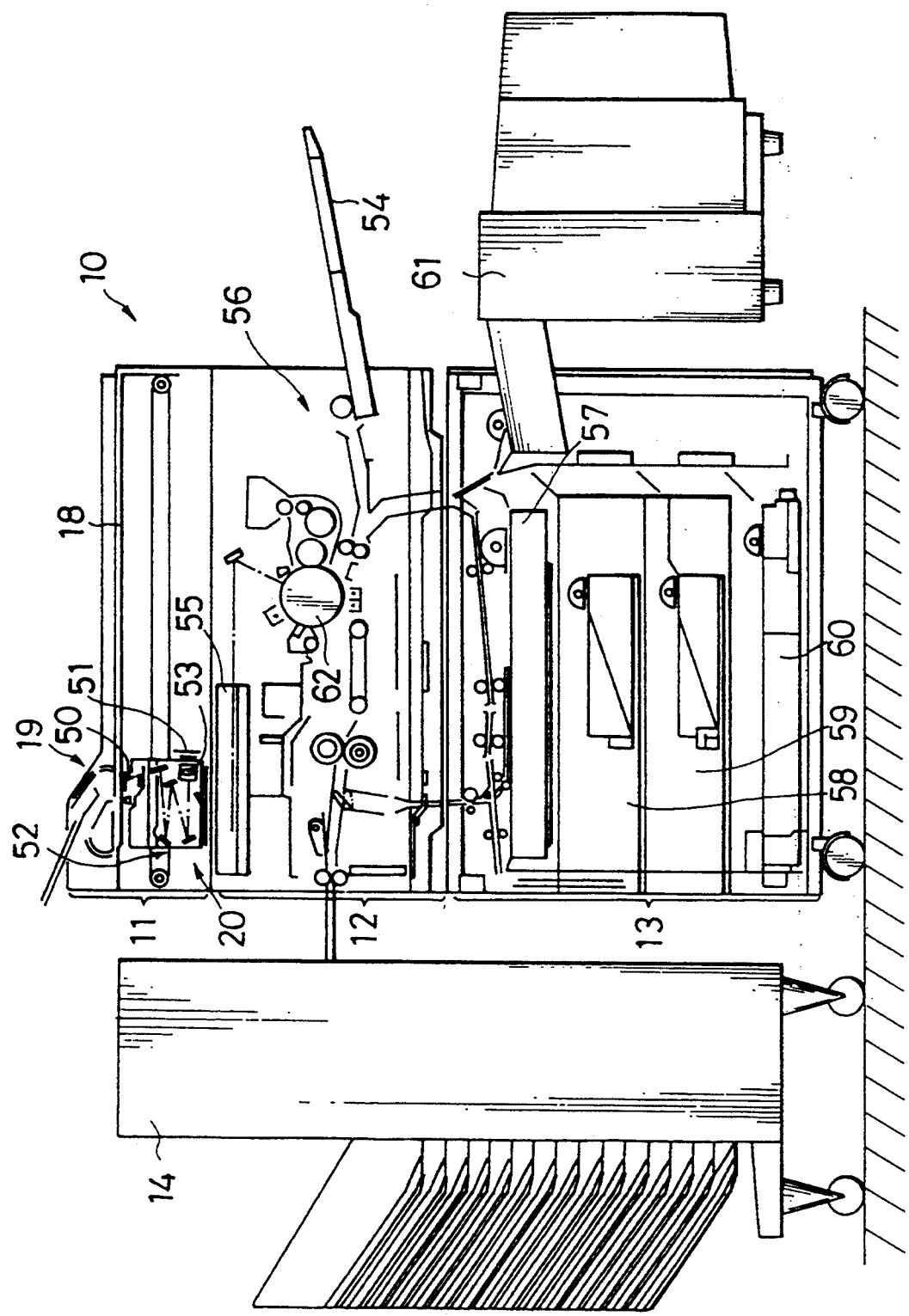
FIG. 1 is a sectional view showing an overall construction of a copying machine provided with a post-processing device according to an embodiment of the present invention.

Hereinafter, the description will be directed to an embodiment of the invention as referring to the drawings.

FIG. 1 is a sectional view showing an overall construction of a copying machine provided with a post-processing device according to an embodiment of the present invention. FIG. 2 is an exemplary plan view showing the copying machine shown in FIG. 1.

The copying machine provided with a post-processing device is a digital copying machine having a stapling device as a post-processing device.

As shown in FIG. 1, a reference numeral 10 denotes the overall copying machine, which includes a scanner unit 11, a laser printer unit 12, a multi-stage paper feeder 13 and a sorter 14.

Figure 3:
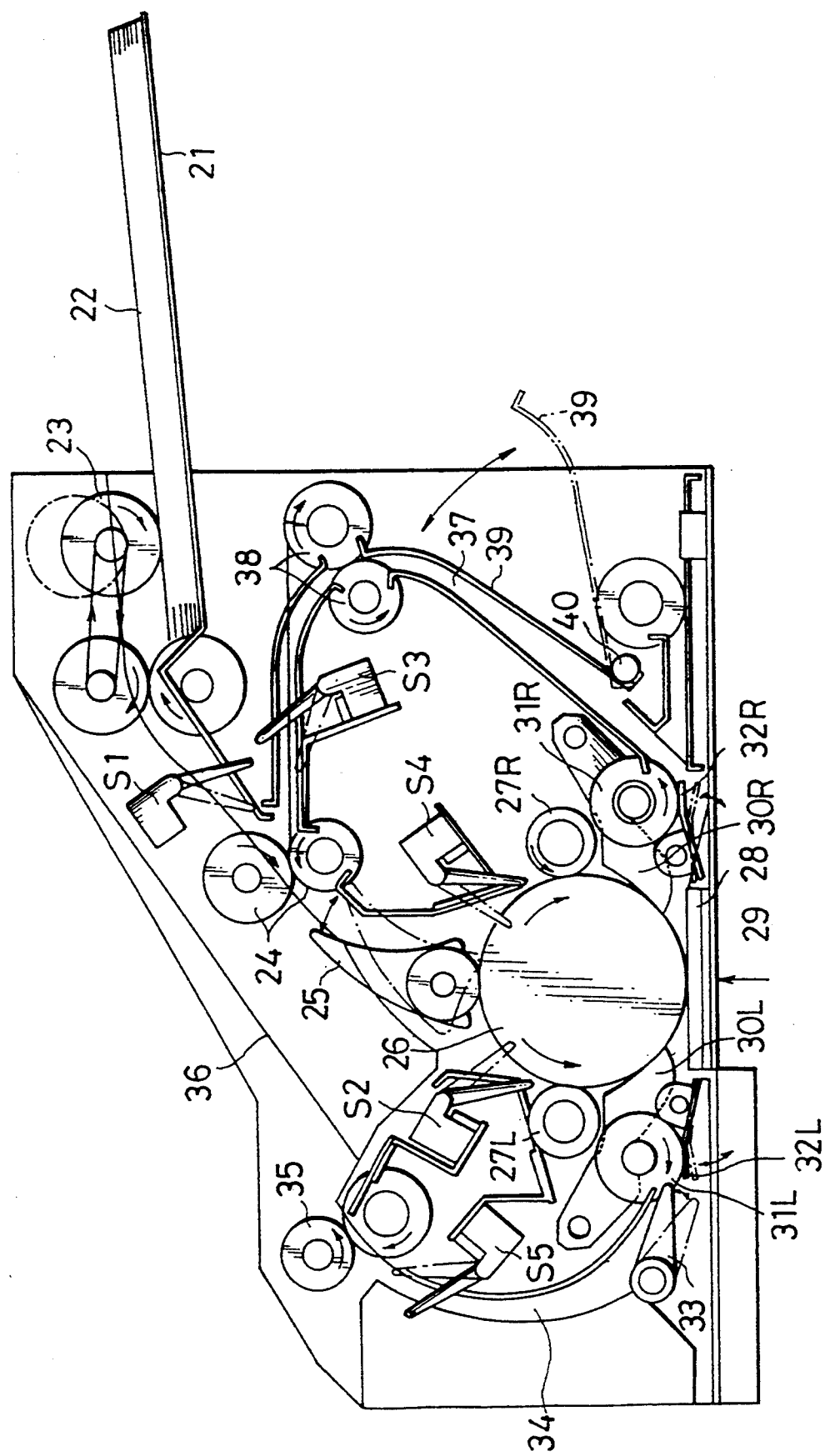
FIG. 3 is a sectional view showing an auto document feeder (ADF) provided in the copying machine shown in FIG. 1.

As shown in FIG. 3, the copying machine 10 provides an operation panel 15 and an original cover 16 on the top. The operational panel 15 contains various input keys. Herein, the term "original" means a sheet to be copied containing pictures, writing, printing and so forth.

A reference numeral 14 denotes a sorter which includes a stapling device 17 functioned as a post-processing device. The stapling device 17 is located on a viewer's side of the sorter 14 as viewed in FIG. 2. The stapling treatment is carried out on the right lower portion of the image-copied sheet (shown by an alternate long and short dash line of FIG. 2) ejected from the laser printer unit 12.

Again, referring to FIG. 1, the scanner unit 11 is arranged to have an original platform 18 made of a transparent glass, an automatic document feeder (referred to as an ADF) 19 and a scanner 20. The ADF 19 is arranged to be capable of feeding both surfaces of the original to the scanner 20. After loading a plurality of originals to the copying machine at a time, the ADF 19 operates to automatically feed the originals one by one to the scanner 20 so that one side or both sides of each original is allowed to be read by the scanner 20 in accordance with the operator's selection.

Then, the arrangement and the function of the ADF 19 will be described later.

FIG. 3 is a sectional view showing the ADF 19 included in the copying machine 10 provided with the post-processing device shown in FIG. 1.

As shown in FIG. 3, the ADF 19 is arranged to have an original pick-up roller 23 to be driven through an electromagnetic clutch (not shown), a pair of feeding rollers 24, a solenoid-driven change lever 25 capable of switching a traveling way of an original 22, an original supporting drum (platen roller) 26 to be rotated in two directions (arrow directions shown in FIG. 3), a right and a left feeding rollers 27L and 27R for feeding the original 22 to an original reading spot (an exposing spot) 29, the rollers 27L and 27R being operated in concert with the platen roller 26, a right and a left original guides 30L and 30R, a transparent original supporting glass 28, a right and a left original ejecting rollers 31L and 31R, a right and a left solenoid-driven movable guides 32L and 32R to be operated in concert with the original ejecting rollers 31L and 31R, a solenoid-driven original ejecting movable guide 38, an original ejecting path 34, a pair of paper ejecting rollers 35, an ejected-paper tray 36, a reversing travel path 37, one side of which is formed by a solenoid-driven original reversing rotatable guide 39, a pair of reversing rollers 38 driven through an electromagnetic clutch, and a shaft or rotation 40.

It is preferable to make the space between the platen roller 26 and the original supporting glass 28 larger than the thickness of the original 22. There are located on the travel path of the original 22 sensors S1 to S5 for sensing an original. When the original 22 is sensed, the sensors S1 to S5 supply the signals to a controller (not shown). This controller serves to operate various electromagnetic clutches and the solenoids at a predetermined timing to be described later so that the original 22 may be fed through the exposing spot 29 to be described later.

Next, the description will be directed to the function of the ADF 19.

When copying just one side of the original 22, an operator is required to load a plurality of originals 22 on an original tray 21 and specify a copying mode (one-side scanning, number of copies, copy density and the like) with the input keys provided on the operation panel 15.

When the operator handles a print switch provided on the operation switch 15, the main motor (not shown) of the ADF 19 starts to be operated.

Next, the clutch of the original pick-up roller 23 is switched on so that the original pick-up roller 23 may pick up and feed just one original located at the top of the piled originals 22 set on the original tray 21. At that time, the clutch of the pair of feeding rollers 24 are switched on so that the feeding rollers 24 may be rotated.

When the tip of the original 22 being fed reaches the first sensor S1, the solenoid of the change lever 25 is excited so that the change lever 25 may be changed from the location shown by an alternate long and short dash line of FIG. 3 to the location shown by a real line. As continuing the feed of the original 22, the tip of the original 22 is guided to the side of the change lever 25 and further to the fourth sensor S4.

After the tip of the original 22 is sensed by the fourth sensor S4, the feed of the original 22 is stopped on a timing supported by the platen roller 26 and the right-side roller 27R. Next, the original 22 is started to be fed to the exposing spot 29 of the original supporting glass 28 on a timing taken with the scanner 20. The original 22 is pressed on the surface of the platen roller 26 by the right original guide 30R and the platen roller 26 rotates clockwise. Then, the original 22 passes between the platen roller 26 and the original supporting glass 28 from a right hand side to a left hand side of FIG. 3. At the exposing spot 29, the image data of the original 22 is read by the scanner 20.

The original 22 passing through the exposing spot 29 is passed under the left original guide 30L and is conveyed toward the left ejecting roller 31L. On a timing when the tip of the original 22 reaches the original ejecting roller 31L, the solenoid of the left movable guide 32L is excited so that the movable guide 32L is pressed against the original ejecting roller 31L as keeping the original 22 laid between the guide 32L and the roller 31L. This results in providing the force of conveyance resulting from the friction of the roller 31L to the original 22. The original 22 is guided along the top of the original ejecting movable guide 33, passes through the original ejecting path 34, and is ejected to the ejected-paper tray 36 by means of a pair of paper ejecting rollers 35.

The fifth sensor S5 located on the way of the original ejecting path 34 serves to sense the rear end of the original 22 for determining whether or not the original 22 is ejected on to the tray 36. If a plurality of originals 22 are set on the original tray 21, the next original is fed on a timing when the rear end of the previous original passes through the exposing spot 29.

The original tray 21 provides an original sensor (not shown) for sensing whether or not the originals 22 are set. The foregoing operation is repeated until the last original 22 is fed out of the original tray 21.

To copy both surfaces of the originals 22, the print switch located on the operational panel 15 is pressed so that the original pick-up roller 23 serves to feed only the top sheet of the originals 22 set on the original tray 21. When the tip of the fed original 22 reaches the first sensor S1, the clutch of a pair of the feeding rollers 24 is switched on so that a pair of the feeding rollers 24 may be rotated. At this time, the solenoid of the change lever 25 remains non-excited in the state that the change lever 25 is located as shown by an alternate long and short dash line shown in FIG. 3. Hence, the tip end of the original 22 is guided to the second sensor S2. Then, the feeding of the original 22 is temporarily stopped in the state that the tip end of the original 22 passed through the second sensor S2 is laid between the platen roller 26 and the left feeding roller 27L.

Next, the original 22 is fed to the exposing spot 29 of the original supporting glass 28 on a timing taken with the scanner 20. The original 22 is pressed on the surface of the platen roller 26 by the left original guide 30L and the platen roller 26 rotates counterclockwise. Then, the original 22 passes between the platen roller 26 and the original supporting glass 28 from a left hand side to a right hand side of FIG. 3. At the exposing spot 29, one side of the original 22 is exposed and the image data is read by the scanner 20.

After passing through the exposing spot 29, the original 22 travels under the right guide 30R and is sent to the right original ejecting roller 31R. On the timing when the tip end of the original 22 reaches the original ejecting roller 31R, the solenoid of the right movable guide 32R is made excited so that the movable guide 32R may be pressed against the original ejecting roller 31R as keeping the original 22 laid between the movable guide 32R and the original ejecting roller 31R. The original 22 is conveyed in that state and guided to the reversing travel path 37. Then, the original 22 is conveyed to the third sensor S3 with the reversing roller pair 38.

When the tip end of the original 22 reaches the third sensor S3, the solenoid of the original reversing guide 39 is made excited so that the original reversing guide 39 may be rotated on the shaft 40 from the location shown by a real line to the location shown by an alternate long and dash line along an arrow shown in FIG. 3, resulting in releasing the reversing path 37. At that time, the solenoid of the change lever 25 is made excited so that the change lever 25 is switched from the location shown by an alternate long and dash line to the location shown by a real line.

The tip end of the original 22 is guided to a pair of the feeding rollers 24 by a pair of the reversing rollers 38. The original 22 is guided toward the fourth sensor S4 along the side of the change lever 25 switched to the location shown by a real line. Then, when the tip end of the original 22 is laid between the platen roller 26 and the right feeding roller 27R, the feeding of the original 22 is temporarily stopped.

After the rear end of the original 22 is passed through the exposing spot 29, the feeding of the original 22 is started to the exposing spot 29 of the original supporting glass 28 in synchronous with the scanner 20. The original 22 is pressed on the surface of the platen roller 26 by the right original guide 30R and the platen roller 26 rotates clockwise. Then, the original 22 passes between the platen roller 26 and the original supporting glass 28 from a right hand side to a left hand side of FIG. 3. At the exposing spot 29, the other side of the original 22 is exposed and the image data of the original 22 is read by the scanner 20.

After passing through the exposing spot 29, the original 22 travels under the left guide 30L and is sent to the left original ejecting roller 31L. On the timing when the tip end of the original 22 reaches the original ejecting roller 31L, the solenoid of the right movable guide 32L is made excited so that the movable guide 32L may be pressed against the original ejecting roller 31L as keeping the original 22 laid between the movable guide 32L and the original ejecting roller 31L. This pressing state allows the original 22 to be conveyed.

On completion of reading the image data on the second side of the original 22, the solenoid of the original reversing guide 39 is made non-excited so that the original reversing guide 39 may be returned to the location shown by a real line. At the location, the original reversing guide 39 waits for the next original for guiding the tip end of it to a pair of the reversing rollers 38.

The original 22 is conveyed as keeping it laid between the movable guide 32L and the original ejecting roller 31L and is guided along the top surface of the original movable guide 33. Then, the original 22 is passed through the original ejecting path 34 and ejected onto the ejected-paper tray 36 by means of a pair of the ejecting rollers 35.

In the case that a plurality of originals are set onto the original tray 21, the next original is fed on a right timing when the rear end of the previous original is passed through the exposing spot 29 when exposing the image on the second side of the previous original.

The foregoing operation is repeated until the last original 22 is fed out.

In turn, the description will be directed to the operation panel 15.

Figure 5:
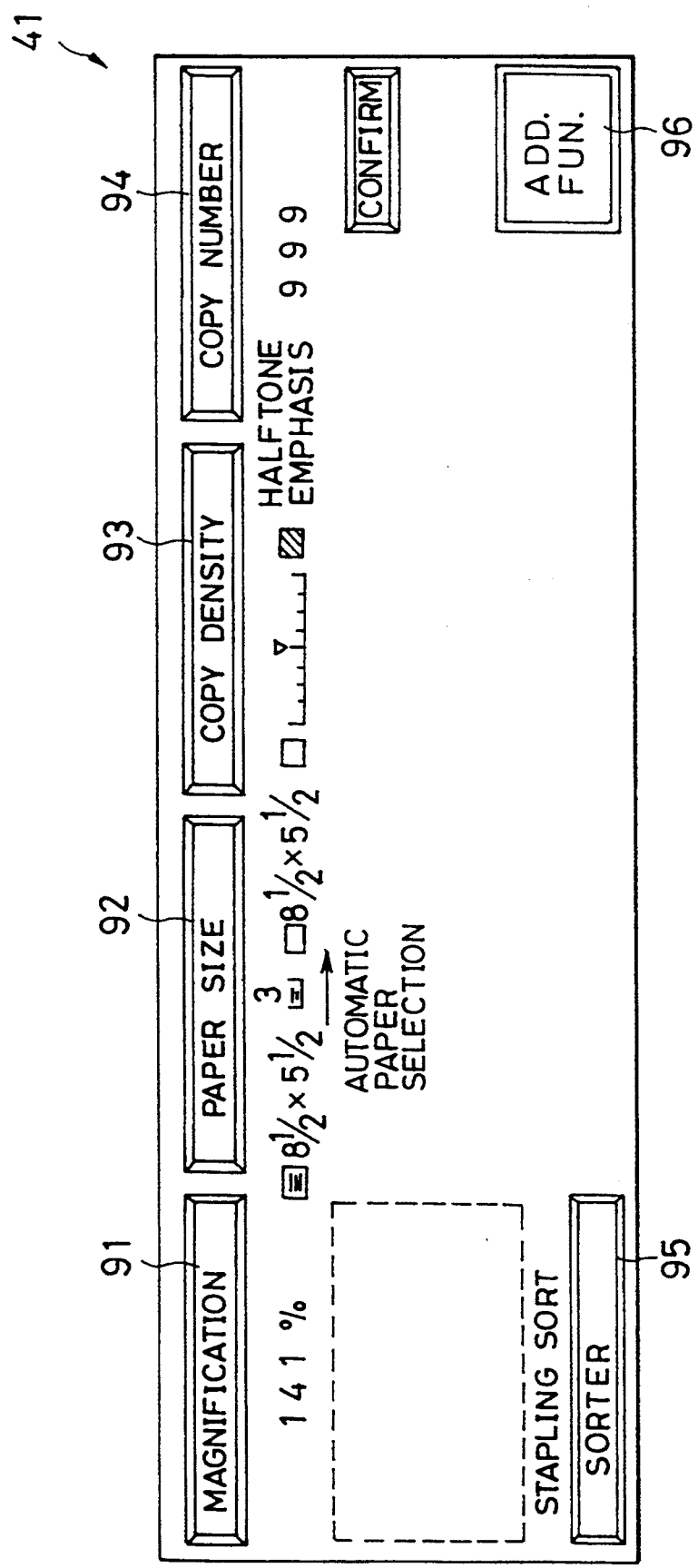
FIG. 5 is an expanded view showing a fundamental screen appearing on the display section of the operation panel shown in FIG. 4.
Figure 6:
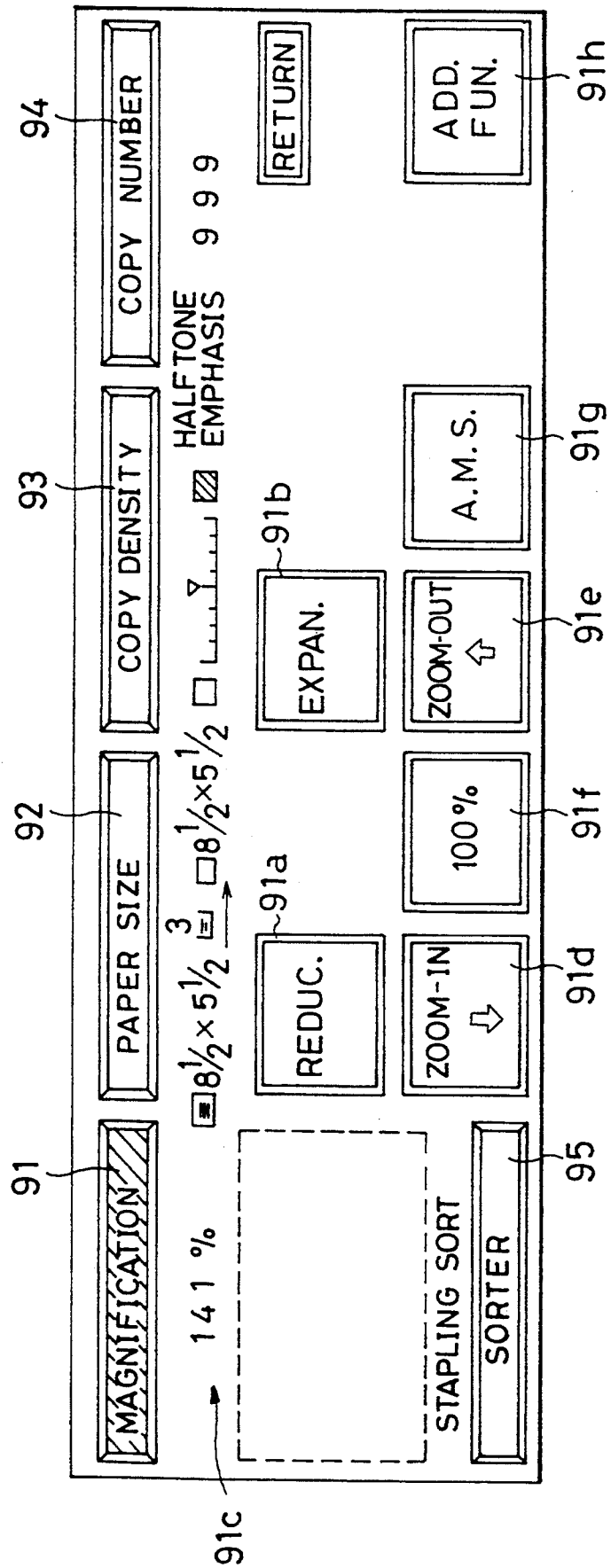
FIG. 6 is an explanatory view showing a magnification screen appearing on the display section of the operation panel shown in FIG. 4.
Figure 7:
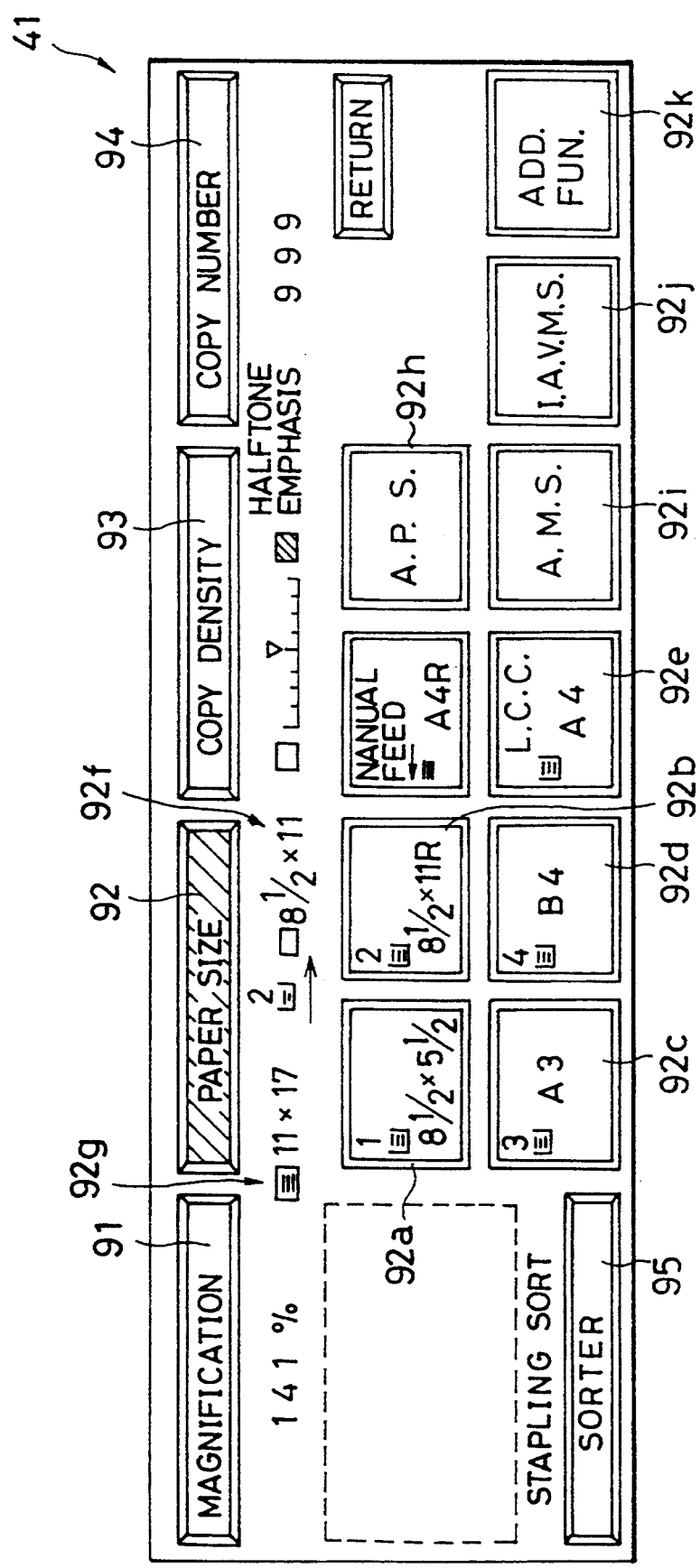
FIG. 7 is an explanatory view showing a paper-size screen appearing on the display section of the operation panel shown in FIG. 4.
Figure 8:
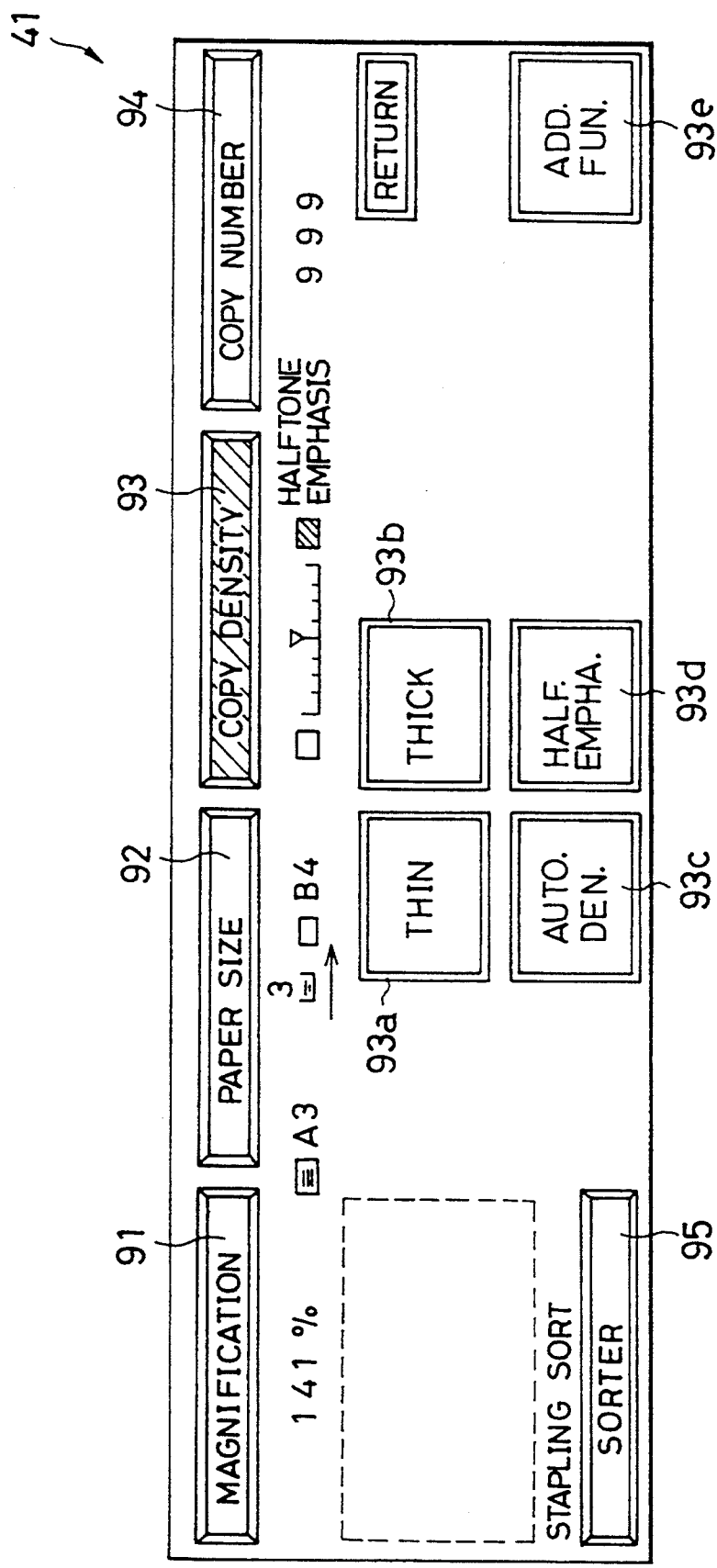
FIG. 8 is an explanatory view showing a copy-density screen appearing on the display section of the operation panel shown in FIG. 4.
Figure 9:
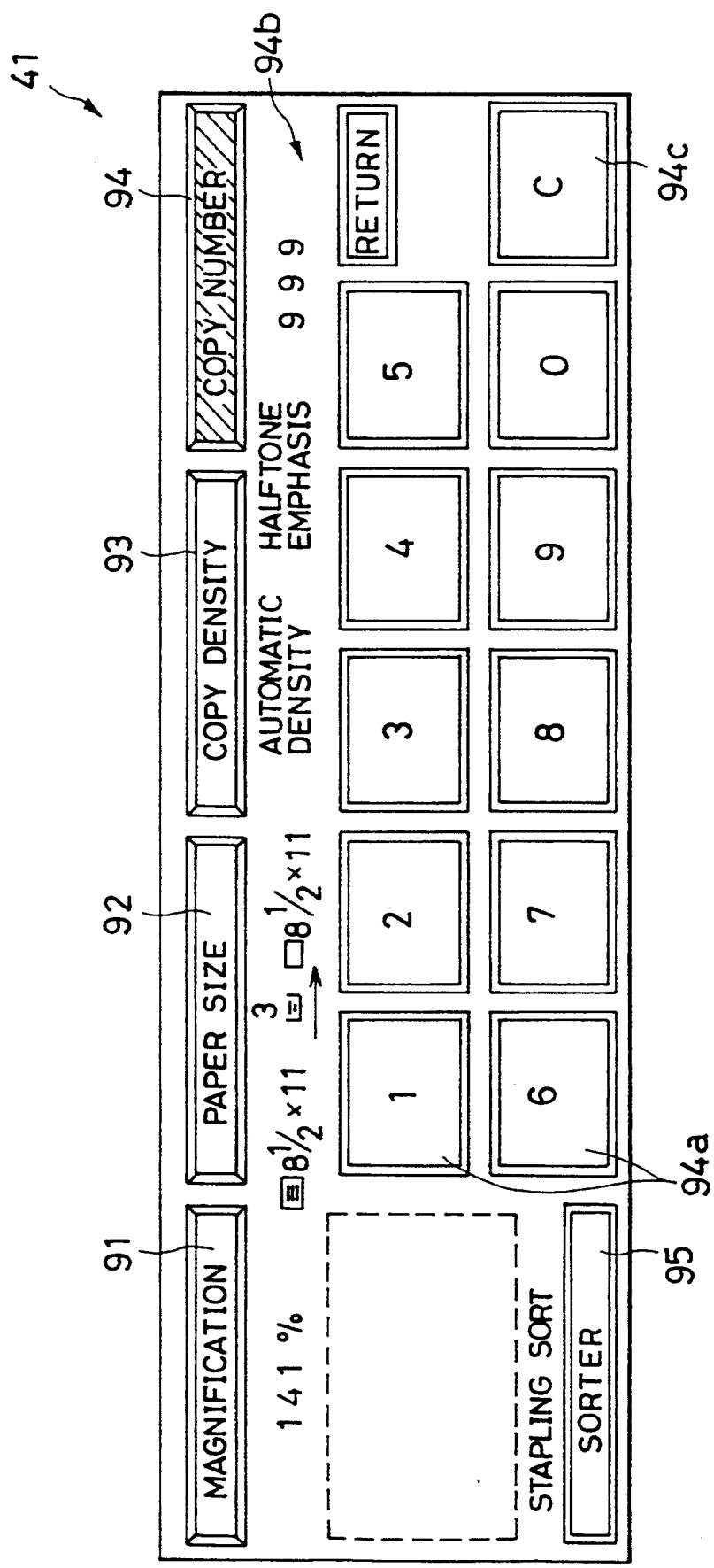
FIG. 9 is an explanatory view showing a copy-number screen appearing on the display section of the operation panel shown in FIG. 4.

FIG. 4 shows an outer appearance of the operation panel 15 provided in the copying machine 10 provided with posted-processing device. FIG. 5 is an expanded view showing a fundamental screen of a display section located on the operation panel 15 shown in FIG. 4. FIG. 6 is an explanatory view showing a magnification screen located on the display section of the operation panel 15 shown in FIG. 4. FIG. 7 is an explanatory view showing a paper-size screen located on the display section of the operation panel 15 shown in FIG. 4. FIG. 8 is an explanatory view showing a copy-density screen located on the display section of the operation panel 15 shown in FIG. 4. FIG. 9 is an explanatory view showing a copy-number screen located on the display section of the operation panel 15 shown in FIG. 4.

As shown in FIG. 4, the operation panel 15 provides a display section 41, a print switch 42 and a clear key 43. The display section 41 is located on the substantially center of the operation panel 15 and has an input area containing a transparent touch panel on the surface of a dot-matrix liquid crystal display. The print switch 42 and the clear key 43 are located on the right end of the operation panel 15.

FIG. 5 shows an expanded fundamental screen appearing when a power switch is turned on. The display section 41 provides a magnification area 91 for selecting a copying magnification, a paper size area 92 for selecting a paper size, a copying density area 93 for selecting a copying density, and a copy number area 94 for selecting a copy number on an upper region and a sort area 95 for selecting a kind of sorting on a lower region.

When an operator touches the magnification area 91, the operation panel 15 is switched to the magnification screen shown in FIG. 6. When he or she touches the paper size area 92, the operation panel 15 is switched to the paper-size screen shown in FIG. 7. When he or she touches the copying density area 93, the operation panel 15 is switched to the copy-density screen shown in FIG. 8. When he or she touches the copy number area 94, the operation panel 15 is switched to the copy-number screen shown in FIG. 9. Each time he or she touches the sort area 95, the operation panel 15 is switched to the "non-sort", "sort", "group", "stapling sort", and "set of a saddle stitch" screen in sequence.

On the expanded fundamental screen shown in FIG. 5, an additional function (referred as ADD. FUN. in FIG. 5) area 96 for selecting various additional functions is arranged at lower right portion.

On the magnification screen shown in FIG. 6, there appear a reduction (referred as REDC. in FIG. 6) area 91a and an expansion (referred as EXPAN. in FIG. 6) area 91b. When the operator touches the reduction area 91a or the expansion area 91b, a fixed magnification is selected. The selected magnification (141% shown in FIG. 6) appears on a magnification area 91c located at the upper left portion of the display section 41. On the screen, a reference numeral 91d denotes a zoom-in area and a reference numeral 91e denotes a zoom-out area. The operator can change the copying magnification one percent by one percent by touching these zoom-in and zoom-out areas 91d and 91e. A 100% area 91f means an area for reverting the copying magnification to an equal magnification. A reference numeral 91g denotes an automatic magnification selection (referred as A. M. S. in FIG. 6) area for selecting an operation mode in which the apparatus itself operates to automatically set the copying magnification in light of an original size and an image formed paper size. On the screen, an additional function (referred as ADD. FUN. in FIG. 6) area 91h for selecting various additional functions is arranged.

On the paper-size screen shown in FIG. 7, there appear selection areas 92a, 92b, 92c, 92d and 92e. Those selection areas indicate the sizes of the papers stored in a first cassette 57, a second cassette 58, a third cassette 59, a fourth cassette 60 and a fifth cassette 61, respectively. The fifth cassette 61 is an additional large capacity cassette (referred as L. C. C. in FIG. 7) according to an operator's desire. Those cassettes are all included in the multi-stage paper feeder 13 of the copying machine 10 shown in FIG. 1. When the operator touches any one of the selection areas 92a, 92b, 92c, 92d and 92e, the corresponding cassette is selected so that the number of the selected cassette (for example, the number 2 shown in FIG. 7) and the paper size (for example, 8½×11 shown in FIG. 7) are displayed on a display area 92f. On a display area 92g, the size of the original (for example, 11×17 shown in FIG. 7) is displayed at the same time.

On the paper-size screen shown in FIG. 7, the display section 41 provides an automatic paper selection (referred as A. P. S. in FIG. 7) area 92h, an automatic magnification selection (referred as A. M. S. in FIG. 7) area 92i, an independent automatic variable magnification selection (referred as I. A. V. M. S. in FIG. 7) area 92j, and an additional function (referred as ADD. FUN. in FIG. 7) area 92k for selecting various additional functions is arranged.

On the copy-density screen shown in FIG. 8, there also appear selection areas 93a, 93b, 93c, 93d and 93e. The selection areas 93a and 93b indicate "thin" and "thick" selection areas, respectively, each copying density of which is adjustable at an operator's desire. The selection area 93c indicates an "automatic density" (referred as AUTO. DEN. in FIG. 8) selection area for selecting an operation mode in which the apparatus itself operates to automatically set a proper copying density on the basis of a judgment of a density of the original. The selection area 93d indicates a "halftone emphasis" (referred as HALF. EMPHA. in FIG. 8) selection area for selecting an operation mode in which a halftone image such as a photograph is emphasized. The selection area 93e indicates an additional function (referred as ADD. FUN. in FIG. 8) selection area for selecting various additional functions.

On the copy-number screen shown in FIG. 9, there also appear a selection area 94a and a selection area 94c for clearance. The selection area 94a is divided into sub areas corresponding to several figures of 0 to 9. With the sub areas, an operator can select his or her desired copy number. When the desired number is selected, the number (for example, 999 shown in FIG. 9) is displayed on a display area 94b.

Figure 10:
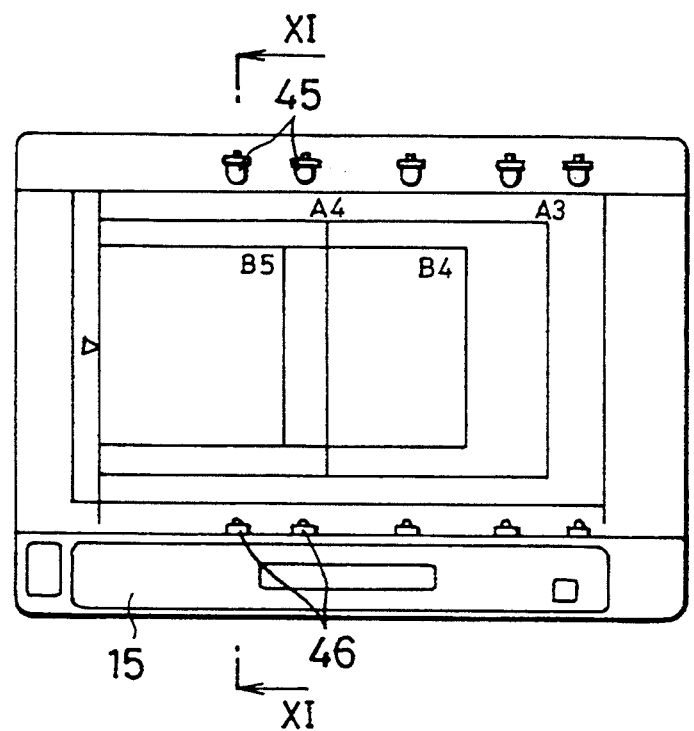
FIG. 10 is a plan view showing an original-size sensor to be provided in the scanner of the copying machine shown in FIG. 1.
Figure 11:
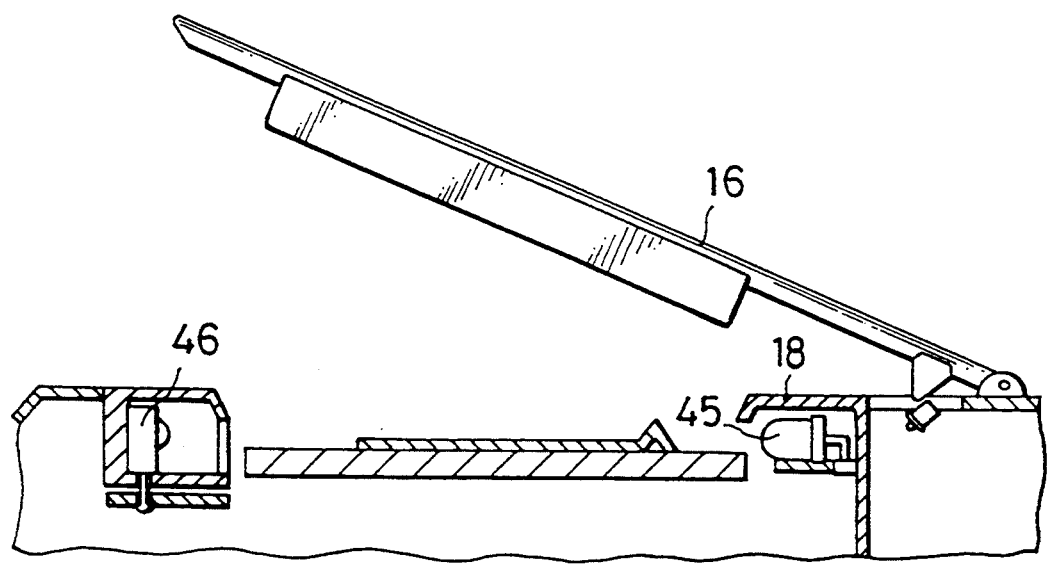
FIG. 11 is a sectional view cut on the line XI—XI of FIG. 10 showing the original-size sensor.

FIG. 10 is a plan view showing an original-size sensor which is allowed to be provided in the scanner unit 11 of the copying machine 10 shown in FIG. 1. FIG. 11 is a sectional view cut on the line XI—XI of the original-size sensor shown in FIG. 10. In FIG. 10, the original cover 18 is abbreviated.

The scanner unit 11 may provide the original-size sensor for sensing a size of an original as shown in FIGS. 10 and 11.

The original-size sensor provides two or more pairs of a light emitting element 45 and a photo detector 46. The two or more pairs of the light emitting element 45 and the photo detector 46 are located on the original platform 18 so that one line connected between one pair of the light emitting element 45 and the photo detector 46 is in parallel to another line connected between another pair. That is, the original size may be detected on the basis of determining whether or not a ray of light emitted from each light emitting element 45 reaches the corresponding photo detector 46.

The sensed original size is displayed on the display area 92g of the display section 41 (see FIG. 7) together with the paper size. For more information about the original-size sensor, see the Japanese Patent Laying Open (KOKAI) No. 2-140603 filed by the applicant of the present invention.

The same original-size sensor is provided in the original tray 21 of the ADF 19 (see FIG. 3) as well.

Again, referring to FIG. 1, the scanner 20 includes a lamp reflector assembly 50 for exposing an original, a plurality of reflective mirrors 52 for guiding a reflective ray of image from the original to a CCD (Charge Coupled Device) 51, and a lens 53 through which the reflective ray of image from the original is formed on the CCD 51.

The scanner unit 11 is arranged to read the image of the original as the scanner 20 is moving along the lower surface of the original platform 18 when scanning the original placed on the platform 18. In the case of using the ADF 19, the scanner unit 11 is arranged to read the image of the original as the original is being conveyed in keeping the scanner 20 stopped at a lower predetermined location of the ADF 19. After various treatments are carried out on the image data read by the scanner 20, the resulting image data is temporarily stored in a memory (not shown). Then, the image data is supplied from the memory to the laser printer unit 12 by which the image is formed on paper.

The laser printer unit 12 provides a manual original tray 54, a laser writing unit 55 and an electronic photograph processing unit 56. The electronic photograph processing unit 56 includes a photosensitive drum 62, a charge unit, a develop unit, a transfer unit, a strip unit, a clean unit and a discharge unit located around the photosensitive drum 62. Based on the image data read from the memory, the laser writing unit 55 serves to apply a laser beam to the photosensitive drum 62 for scanning the surface of the photosensitive drum 62. It results in being able to form an electrostatic latent image on the surface of the photosensitive drum 62. The electrostatic latent image is visualized with toner. The visualized toner image is electrostatically transferred from the photosensitive drum 62 onto the surface of the paper fed from the multi-stage feeder 13 and then is fixed on the paper. The paper on which the original image is formed is sent to the sorter 14 and then is processed in the stapling device 17 shown in FIG. 2 if necessary.

As mentioned above, the multi-stage paper feeder 13 includes the first cassette 57, the second cassette 58, the third cassette 59, the fourth cassette 60 and the fifth cassette 61 to be added according to the operator's desire. In the multi-stage paper feeder 13, the sheets of paper accommodated in the cassette of each stage are fed out to the laser printer unit 12 one by one.

In turn, the description will be directed to an arrangement and a function of a control unit included in the copying machine 10 provided with the post-processing device according to this embodiment.

FIG. 12 is a block diagram showing the control unit included in the copying machine 10 shown in FIG. 1.

As shown in FIG. 12, the control unit is arranged to have an image data input unit 70, an image processing unit 71, an image data output unit 72, a memory 73 composed of a random-access memory, and a central processing unit (CPU) 74.

The image data input unit 70 includes a CCD section (referred as CCD SEC. in FIG. 12) 70a, a histogram processing section (referred as HIST. PRO. SEC. in FIG. 12) 70b and an error diffusing processing section (referred as ER. DIF. PRO. SEC. in FIG. 12) 70c. The image data input unit 70 serves to convert the image data read by the CCD 51 (see FIG. 1) into the binary data. Then, the image data input unit 70 operates to process the image data with an error diffusion method as forming a histogram with the binary digital data. The processed image data is temporarily stored in the memory 73.

That is, the CCD section 70a serves to convert an analog signal corresponding to each pixel density of the image data into a digital signal. Then, an MTF correction, a monochrome correction or a gamma correction is carried out on the digital signal so that the digital signal contains 256 tones (8 bits). The resulting digital signal is output to the histogram processing section 70b.

In the histogram processing section 70b, the digital signal output from the CCD section 70a is added for each of 256-tone pixel densities, resulting in obtaining the density data (histogram data). The histogram data is sent to the CPU 74 if necessary or sent as the pixel data to the error diffusing processing section 70c.

The error diffusing processing section 70c serves to convert the digital signal of 8 bits/pixel output from the CCD section 70a into one-bit (binary) signal and perform the redistribution operation for accurately representing the local area density of the original image based on the converted signal. This error diffusing processing section 70c employs the error diffusion method which is one kind of pseudo halftone processing, that is, the method for reflecting the binary error on a binary judgment of the adjacent pixels.

The image processing unit 71 includes multiple-value processing sections (referred as MUL.-VAL. PRO. SEC., respectively, in FIG. 12) 71a and 71b, a synthesizing section (referred as SYN. SEC. in FIG. 12) 71c, a density converting processing section (referred as DEN. CONV. PRO. SEC. in FIG. 12) 71d, a multiplication changing processing section (referred as MULTI. CHG. PRO. SEC. in FIG. 12) 71e, an image processing section (referred as IMAGE PRO. SEC. in FIG. 12) 71f, an error diffusing processing section (referred as ER. DIF. PRO. SEC. in FIG. 12) 71g and a data compressing processing section (referred as COMPRS. PRO. SEC. in FIG. 12) 71h. The image processing section 71 serves to finally convert the input image data into the image data desired by an operator and to output the finally converted image data to the memory 73. All the sections 71a to 71h included in the image processing unit 71 always do not necessarily function. Each of the sections functions if necessary in accordance with a processing of the image data.

The multiple-value processing sections 71a and 71b serve to convert the binary data output from the error diffusing processing section 70c into 256-tone data again. The synthesizing section 71c serves to selectively perform a logical operation such as a logical OR, a logical AND or an exclusive OR with respect to each pixel. The data processed by the synthesizing section 71c is the pixel data stored in the memory 73 or the bit data output from a pattern generator (PG). The density converting processing section 71d functions as establishing a proper relation between an input density and an output density of the 256-tone digital signal by referring to a predetermined tone converting table. The magnification changing processing section 71e serves to perform the interpolation of the input data according to a predetermined magnification data and derive a density value corresponding to the interpolated pixel. The magnification changing processing section 71e changes the magnification of the sub scan and then the main scan. The image processing section 71f serves to perform various image treatments of the input pixel data and collect the information about the data row such as an abstraction of the feature. The error diffusing processing section 71g performs the similar processing to the error diffusing processing section 70c included in the image data input unit 70.

The data compressing processing section 71h serves to compress the binary data with a run length coding method. When the final image data is completed, the compression of the image data is executed at the final processing loop.

The image data output unit 72 is arranged to have a restoring section (referred as RES. SEC. in FIG. 12) 72a, a multiple-value processing section (referred as MUL.-VAL. PRO. SEC. in FIG. 12) 72b, an error diffusing processing section (referred as ER. DIF. PRO. SEC. in FIG. 12) 72c and a laser output section (referred as LASER OUT. SEC. in FIG. 12) 72d. The image data output unit 72 operates to restore the compressed image data stored in the memory 73, convert the restored data into an original 256-tone image data, perform the error diffusion of quadruple data, and transfer the resulting data to the laser output section 72d. The quadruple data represents a smoother halftone than the binary data.

The restoring section 72a serves to restore the image data compressed by the compressing processing section 71h. Then, the multiple-value processing section 72b performs the similar operation to the multiple-value processing sections 71a and 71b of the image processing unit 71. The error diffusing processing section 72c performs the similar operation to the error diffusing processing section 70c included in the image data input unit 70. In accordance with control signal sent from a sequence controller (not shown), the laser output section 72d serves to convert the digital pixel data into an ON/-Off signal of the laser, on which the laser is switched on and off.

The data to be processed in the image data input unit 70 and the image data output unit 72 is stored as binary data in the memory 73 because of reducing the volume of the memory 73. For avoiding making the image data inferior, the quadruple data may be processed in the image data input unit 70 and the image data output unit 72.

In turn, the description will be directed to the method for specifying where to be post-processed by the stapling device 17 shown in FIG. 2.

FIGS. 13a to 13d are explanatory views showing how to specify the post-processing (stapling) location by the stapling device 17 shown in FIG. 2. In particular, FIGS. 13a and 13b are explanatory views showing the state where one mark sheet is placed on a bundle of originals to be copied. FIG. 13c is an explanatory view showing the state where a particular mark is given on the mark sheet. FIG. 13d is an explanatory view showing the state where the particular mark is read from the mark sheet.

As shown in FIGS. 13a and 13b, at first, one mark sheet 75 is placed on a bundle of originals 22 to be copied. Then, as shown in FIG. 13c, an operator writes a particular mark 76 on the mark sheet 75 with a pencil or something. The location of the mark 76 indicates the stapling location specified by the operator. The mark sheet 75 may be an exclusive sheet or a normal copy sheet.

The bundle of originals 22 and the mark sheet 75 placed on the bundle of originals 22 are set on the ADF 19 shown in FIGS. 1 and 2. By operating the print switch of the operation panel 15, the ADF 19 supplies the mark sheet 75 to the scanner unit 11 and the scanner 20 reads the image in a memory area 77 and the location of the mark 76 as shown in FIG. 13d. The image data of the original and the data about the location of the mark 76 are temporarily stored in the memory 73 shown in FIG. 12.

The area corresponding to the data about an original size is checked in the memory by using the data about an original size sensed by the original-size sensor shown in FIG. 10. At that time, it is also checked where the mark 76 is located in the memory area 77 for determining where to be post-processed.

FIG. 13 shows an embodiment wherein the mark sheet 75 is placed on the bundle of originals 22 for specifying where to be post-processed. As another method, the mark 76 may be directly written on the first sheet of originals 22 and the mark 76 may be automatically erased from the image data when the image of the original 22 is read and the read original image is output.

Next, the description will be directed to a control procedure for rotating the image data read by the scanner unit.

Figure 14A:
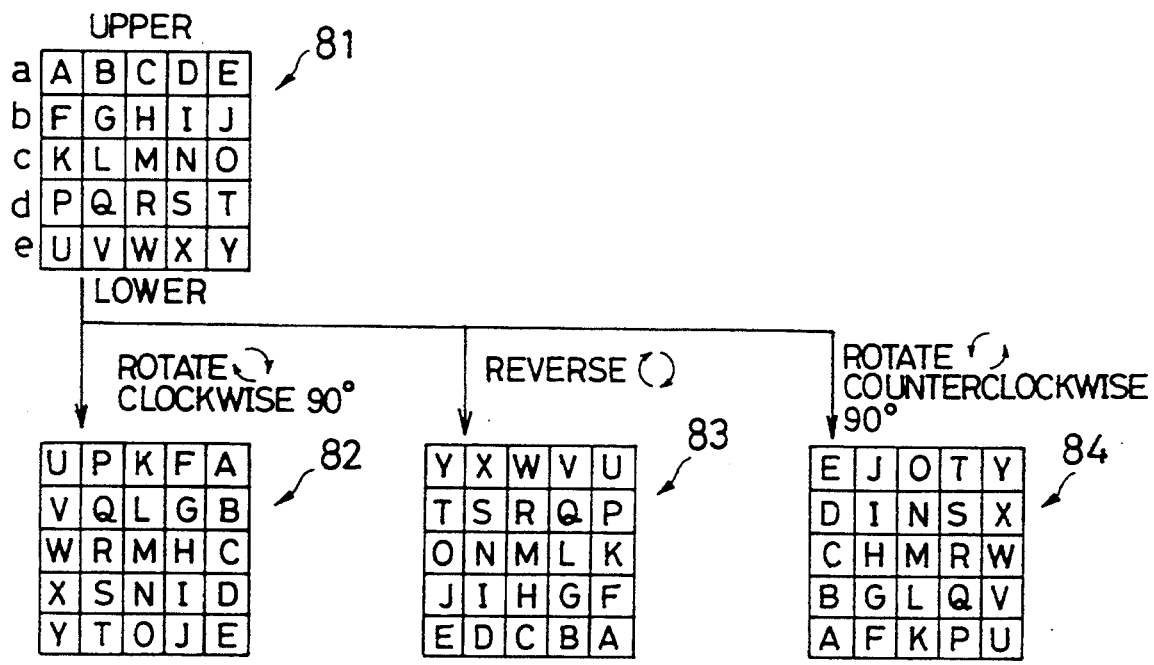
FIGS. 14a and 14b are explanatory views showing a control procedure for rotating image data.
Figure 14B:
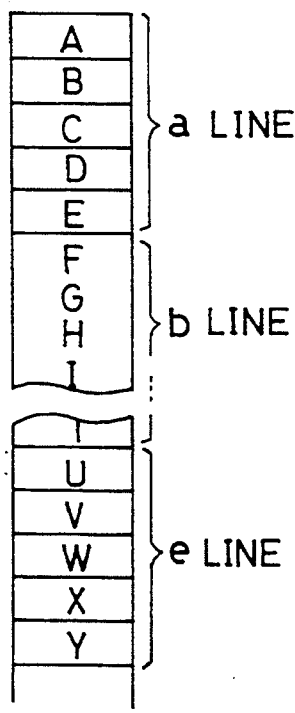

FIGS. 14a and 14b are explanatory views showing a control procedure for rotating the image data. In particular, FIG. 14a shows the image data read from an original, the state where the original image is rotated clockwise 90°, the state where the original image is rotated 180°, that is, reversed, and the state where the original image is rotated counterclockwise 90°. FIG. 14b shows how the image data is stored in the memory.

As shown in FIG. 14a, a reference numeral 81 denotes image data of an original read by the scanner. The image data 81 stored in the memory has the format shown in FIG. 14b.

Consider that the original image is required to be reoriented according to the location of the stapling device 17 (see FIG. 2) and the stapling location specified by an operator (the location of the mark 76 shown in FIGS. 13c and 13d). If it is necessary to turn the image data 81 clockwise 90°, the image data is read from the memory in the sequence of "U, P, K, F, A, V, Q, L, G, B, ..., Y, T, 0, J, E" so as to form the image data 82 and the sequentially read image data is output to the laser printer unit 12 of FIG. 1. If it is necessary to reverse the image data 81, the image data is read from the memory in the sequence which allows the image data 83 to be formed. If it is necessary to turn the image data 81 counterclockwise 90°, the image data is read from the memory in the sequence which allows the image data 84 to be formed.

As another procedure, it is possible to re-sort the image data temporarily stored in the memory and form the rotated image data in the memory, and then read the rotated image data in sequence.

If two or more copy numbers are specified in the apparatus, the reading operation is repeated two or more times.

Next, the description will be directed to the operation of the digital copying machine provided with the post-processing device.

Figure 15:
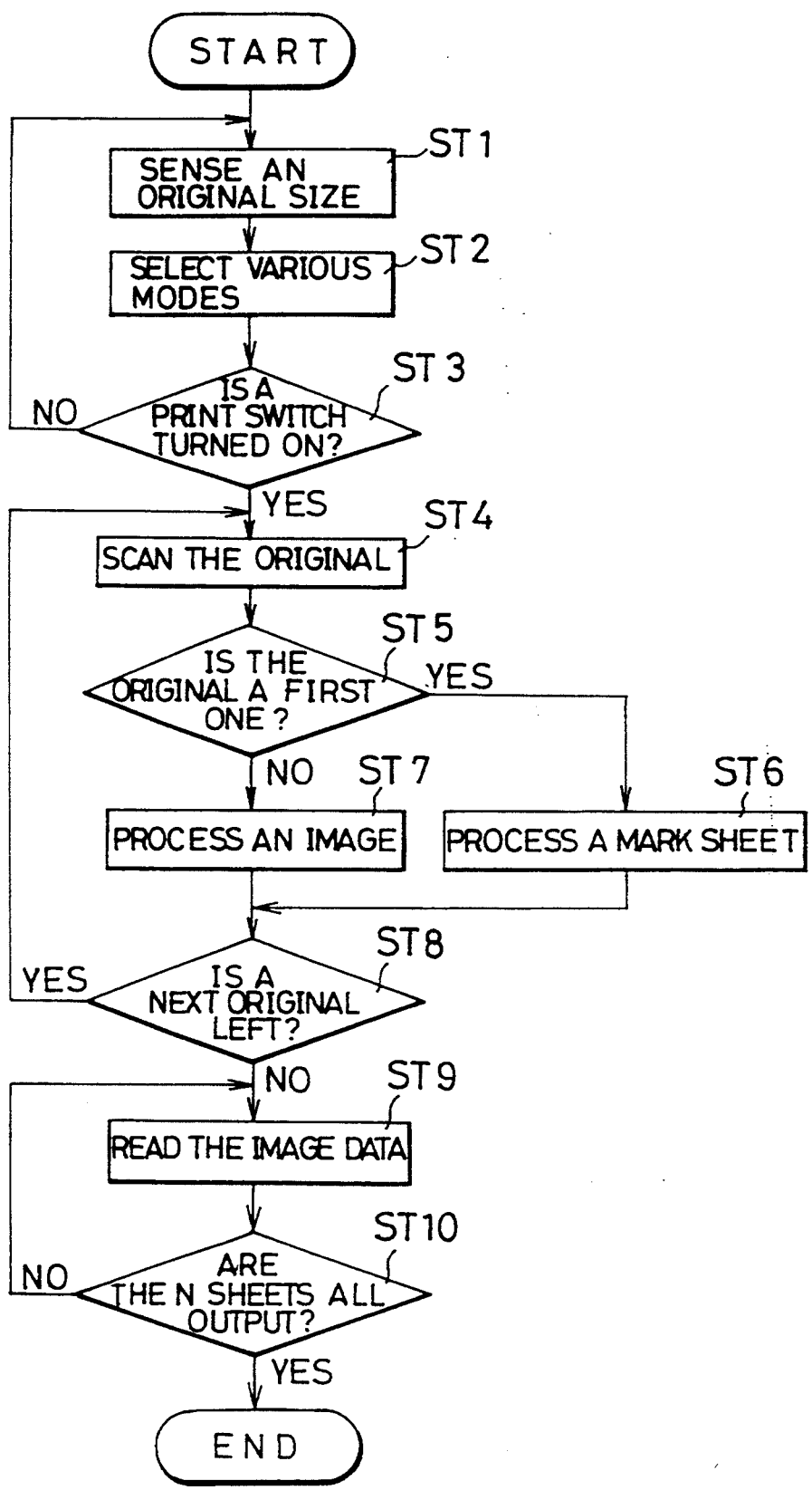
FIG. 15 is a flowchart showing the operation of the copying machine shown in FIG. 1.

FIG. 15 is a flowchart showing the operation of the copying machine provided with the post-processing device according to the foregoing embodiment. The control of the operation shown in this flowchart is executed by the control unit shown in FIG. 12 if the stapling mode is selected on the operation panel 15 shown in FIG. 2.

As shown in FIG. 15, at first, the operator sets the bundle of originals 22 and the mark sheet 75 placed thereon on the ADF 19 shown in FIG. 1. Then, the original-size sensor (see FIG. 10) starts to be operative for sensing an original size (step ST1).

Next, the operator selects some modes such as a copying magnification, a paper size, a copy density, a copy number and a kind of sorter by means of the operation panel 15 (step ST2). When the print switch is pressed on the operation panel 15 (step ST3), the ADF 19 operates to feed the originals one by one to a travel way. The scanner 20 serves to read the image of the original and send the image data to the image data input unit 70 (see FIG. 12) in which the image data is converted into a binary data. The binary data is temporarily stored in the memory 73 (step ST4). Then, the process goes to a step ST5. If the print switch is not pressed at the step ST3, the process returns to the step ST1.

At the step ST5, it is determined whether or not the fed original is the first one. If it is the first original, the original is recognized as a mark sheet and the mark is read from the first original. The location data indicated in the read mark is processed for sensing the exact location of the mark from the data and determining where to be post-processed (step ST6).

If it is not the first original, the image on the original is read. If the storage of the image data to the memory 73 is completed, the image data of the original stored in the memory 73 is processed in the image processing unit 71 on the basis of the mode specified by the operator at the step ST2 (step ST7). At that time, from the location of the stapling device 17 in the sorter 14, it is determined where the image to be formed is directed relative to the sheet of paper. If the rotation of the image data is necessary, the CPU 74 gives an order of rotating the image data so that the image data may be rotated in the memory 73 as shown in FIG. 14.

The original reading (scanning) and the image processing operations are continued until all the originals on the original tray 21 are fed out (step ST8). The image data is repetitively read out of the memory 73 according to the copy number (N) specified by the operator (step ST9) for forming the specified number of copies in the laser printer unit 12 (step ST10).

If it is determined that the rotation of the image data is required at the step ST7, it is possible to read the data from the memory 73 in the sequence of rotating the image.

Figure 16:
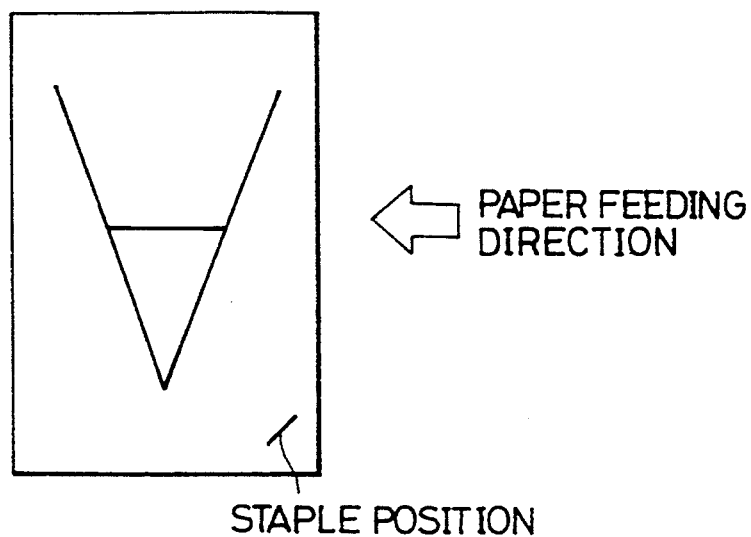
FIG. 16 is an explanatory view showing a copy sheet in which a staple is given at a right place by the stapling device.
Figure 17:
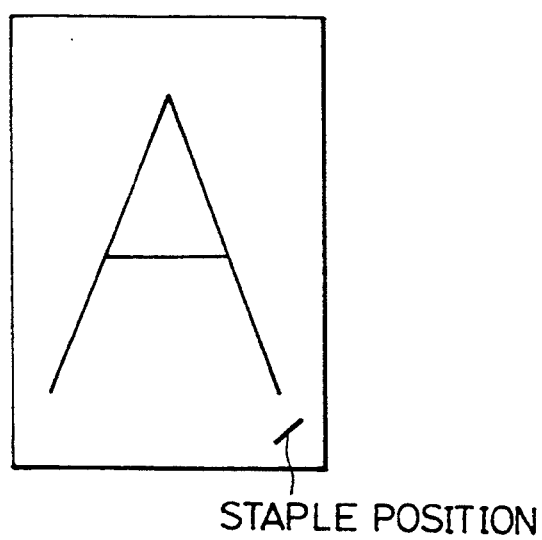
FIG. 17 is an explanatory view showing a copy sheet in which a staple is given at a wrong place by the stapling device.

FIG. 16 is an explanatory view showing an example in which a staple is given at a right place by the stapling device. FIG. 17 is an explanatory view showing an example in which a staple is given at a wrong place by the stapling device.

The control unit included in the copying machine provided with the post-processing device serves to rotate the image data so that the staple may be given at a right place of the sheet of paper as shown in FIG. 16. That is, the control unit makes contribution to avoiding incorrect placement of the staple as shown in FIG. 17.

According to the foregoing embodiment, therefore, the post-processing operation is allowed to be automatically performed at a desired spot of an image-formed sheet. Since the stapling device (corresponding to the post-processing device) is located at a predetermined location inside of the sorter 14, the copying machine keeps the overall size unchanged. It means that the copying machine provided with a post-processing device can endure a more strict requirement of the specification than the known apparatus.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus provided with a post-processing device for performing a post-processing on an image formed sheet of paper, the apparatus comprising:

reading means for reading respective locations of an image and a mark on a mark sheet, said mark being written by an operator on said mark sheet for specifying a location of said post-processing, said mark sheet being placed on a bundle of originals; and forming means for forming an image data read by said reading means on a sheet of paper by performing a predetermined processing on the read image data, said forming means moves a location of said image data formed on said sheet of paper, such that a location of said mark in accord with a mark read by said reading means which corresponds to the specified location of said post-processing device.

2. An apparatus according to claim 1, wherein said post-processing device is located at a predetermined location inside of a sorter of said image forming apparatus.

3. An apparatus according to claim 1, wherein said post-processing device comprises a stapling device.

4. An apparatus according to claim 1, wherein said forming means is adapted to rotate said image data.

5. An apparatus according to claim 1, wherein said mark sheet comprises an exclusive sheet.

6. An apparatus according to claim 1, wherein said mark sheet comprises an uppermost sheet of said originals, and said forming means is adapted to erase said mark on forming said image data on said sheet of paper.

* * * * *